US012481635B2

(12) United States Patent
Fink et al.

(10) Patent No.: US 12,481,635 B2
(45) Date of Patent: *Nov. 25, 2025

(54) INDEXING AND RELAYING DATA TO HOT STORAGE

(71) Applicant: Palantir Technologies Inc., Denver, CO (US)

(72) Inventors: Robert Fink, San Francisco, CA (US); Amr Al Mallah, New York, NY (US); Haithem Turki, New York, NY (US)

(73) Assignee: Palantir Technologies Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/440,724

(22) Filed: Feb. 13, 2024

(65) Prior Publication Data
US 2024/0184761 A1 Jun. 6, 2024

Related U.S. Application Data

(63) Continuation of application No. 18/138,492, filed on Apr. 24, 2023, now Pat. No. 11,914,566, which is a (Continued)

(30) Foreign Application Priority Data
May 9, 2018 (GB) ...................................... 1807534

(51) Int. Cl.
*G06F 16/21* (2019.01)
*G06F 16/22* (2019.01)
(Continued)

(52) U.S. Cl.
CPC ........ *G06F 16/2272* (2019.01); *G06F 16/212* (2019.01); *G06F 16/2228* (2019.01); *G06F 16/2379* (2019.01); *G06F 16/245* (2019.01)

(58) Field of Classification Search
None
See application file for complete search history.

(56) References Cited

U.S. PATENT DOCUMENTS 6,988,109 B2    1/2006  Stanley et al.
8,015,143 B2    9/2011  Estes
(Continued)

OTHER PUBLICATIONS

Bonér, Jonas, "Reactive Microservices Architecture: Design Principles for Distributed Systems", O'Reilly Media, Inc., Mar. 2016, 54 pages. (Year: 2016).*
(Continued)

*Primary Examiner* — Scott A. Waldron
(74) *Attorney, Agent, or Firm* — Duane Morris LLP

(57) ABSTRACT

A method comprises receiving, from one or more search nodes of a distributed system, one or more requests for log data, the one or more search nodes being associated with one or more first storage systems; identifying an indexed portion of the log data stored in a second storage system of one or more second storage systems based on a particular request of the one or more requests, the log data being indexed by one or more indexing nodes independently from the one or more requests being received and processed by the one or more search nodes; changing a first number of the one or more search nodes and updating a second number of the one or more indexing nodes independently.

20 Claims, 5 Drawing Sheets

Related U.S. Application Data continuation of application No. 17/518,407, filed on Nov. 3, 2021, now Pat. No. 11,669,507, which is a continuation of application No. 16/003,548, filed on Jun. 8, 2018, now Pat. No. 11,176,113.

(51) Int. Cl.
*G06F 16/23* (2019.01)
*G06F 16/245* (2019.01)

(56) References Cited

U.S. PATENT DOCUMENTS

| | | | |
|---|---|---|---|
| 9,569,070 | B1 | 2/2017 | Ma et al. |
| 9,626,158 | B1 | 4/2017 | Ben-Tzur |
| 9,712,576 | B1 | 7/2017 | Gill |
| 10,789,263 | B2 | 9/2020 | Beard et al. |
| 10,803,106 | B1 | 10/2020 | Beard et al. |
| 11,816,156 | B2 | 11/2023 | Tonkin |
| 2006/0165040 | A1 | 7/2006 | Rathod et al. |
| 2008/0086498 | A1 | 4/2008 | Sureka |
| 2012/0016849 | A1 | 1/2012 | Garrod et al. |
| 2012/0197934 | A1 | 8/2012 | Zhang et al. |
| 2014/0108461 | A1 | 4/2014 | B'Far et al. |
| 2014/0156638 | A1 | 6/2014 | Joshi et al. |
| 2015/0227598 | A1 | 8/2015 | Hahn et al. |
| 2015/0293955 | A1* | 10/2015 | Dickey ............ G06F 16/245 707/756 |
| 2016/0085515 | A1 | 3/2016 | Ben-Tzur et al. |
| 2016/0085516 | A1 | 3/2016 | Ben-Tzur et al. |
| 2016/0110408 | A1* | 4/2016 | Madhavarapu ..... G06F 16/2358 707/615 |
| 2016/0224600 | A1 | 8/2016 | Munk |
| 2016/0255139 | A1 | 9/2016 | Rathod |
| 2016/0301753 | A1 | 10/2016 | Auch et al. |
| 2017/0193021 | A1 | 7/2017 | Deng et al. |
| 2017/0235848 | A1 | 8/2017 | Van Dusen et al. |
| 2018/0027006 | A1 | 1/2018 | Zimmermann et al. |
| 2019/0102430 | A1 | 4/2019 | Wang et al. |
| 2019/0347343 | A1 | 11/2019 | Fink et al. |
| 2020/0311070 | A1 | 10/2020 | Yan et al. |
| 2021/0034614 | A1 | 2/2021 | Kothari et al. |
| 2021/0209249 | A1 | 7/2021 | Hoffer |
| 2023/0334080 | A1 | 10/2023 | Tonkin et al. |
| 2024/0296181 | A1 | 9/2024 | Busany et al. |
| 2024/0354326 | A1 | 10/2024 | Baker et al. |
| 2024/0354567 | A1 | 10/2024 | Duggal et al. |

OTHER PUBLICATIONS

Palantir, "Indexing and Querying Telemetry Logs with Lucene", blog post published Aug. 8, 2018, 17 pages. (Year: 2018).*
Sethi, Raghav, et al. "Presto: SQL on everything." 2019 IEEE 35th International Conference on Data Engineering (ICDE), https://doi.org/10.1109/icde.2019.00196, Apr. 2019, 12 pages.
Anonymous: "Overview—Palantir Foundry", Jan. 31, 2023 (Jan. 31, 2023), pp. 1-4, XP093205277, Retrieved from the Internet: URL: https://web.archive.org/web/20230131034452/https://www.palantir.com/docs/foundry/platform-overview/overview/.
Anonymous: "Data integration Overview—Palantir", May 18, 2022 (May 18, 2022), pp. 1-2, XP093205977, Retrieved from the Internet: URL: https://web.archive.org/web/20220518064333/https://www.palantir.com/docs/foundry/data-integration/overview/.
Higgins Andrew et al.: "How Palantir Foundry Helps Customers Build and Deploy AI-Powered Decision-Making Applications I AWS Partner Network (APN) Blog", Apr. 12, 2022 (Apr. 12, 2022), pp. 1-10, XP093205395, Retrieved from the Internet: URL: web.archive.org/web/20220412042602mp_/https://aws.amazon.com/blogs/apn/how-palantir-foundry-helps-customers-build-and-deploy-ai-powered-decision-making-applications/.
Anonymous: "Object Storage V1 (Phonograph)—Palantir", Jan. 29, 2023 (Jan. 29, 2023), pp. 1-3, XP093209496, Retrieved from the Internet: URL: https://web.archive.org/web/20230129030331/https://www.palantir.com/docs/foundry/ontology-manager/object-storage-v1/.
Anonymous: "Save changes to the Ontology—Palantir", May 23, 2022 (May 23, 2022), pp. 1-4, XP093205386, Retrieved from the Internet: URL: https://web.archive.org/web/20220523050510/https://www.palantir.com/docs/foundry/ontology-manager/save-changes/.
Anonymous: "Permissions—Palantir Foundry", May 21, 2022 (May 21, 2022), pp. 1-6, XP093205376, Retrieved from the Internet: URL: https://web.archive.org/web/20220521182741/https://www.palantir.com/docs/foundry/ontology-manager/permissions/.
Extended European Search Report in EP Application No. 24171562.2, dated Oct. 14, 2024, in 17 pages.
Extended European Search Report in EP Application No. 24171618.2, dated Oct. 14, 2024, in 15 pages.
Extended European Search Report in EP Application No. 24171617.4, dated Oct. 14, 2024, in 15 pages.
Extended European Search Report in EP Application No. 25170785.7, dated Sep. 22, 2025, 14 pages.
Extended European Search Report in EP Application No. 25170786.5, dated Sep. 24, 2025, 8 pages.
Notice of Allowance and Fees Due issued by the United States Patent and Trademark Office in U.S. Appl. No. 18/744,290, dated Oct. 21, 2025.

* cited by examiner

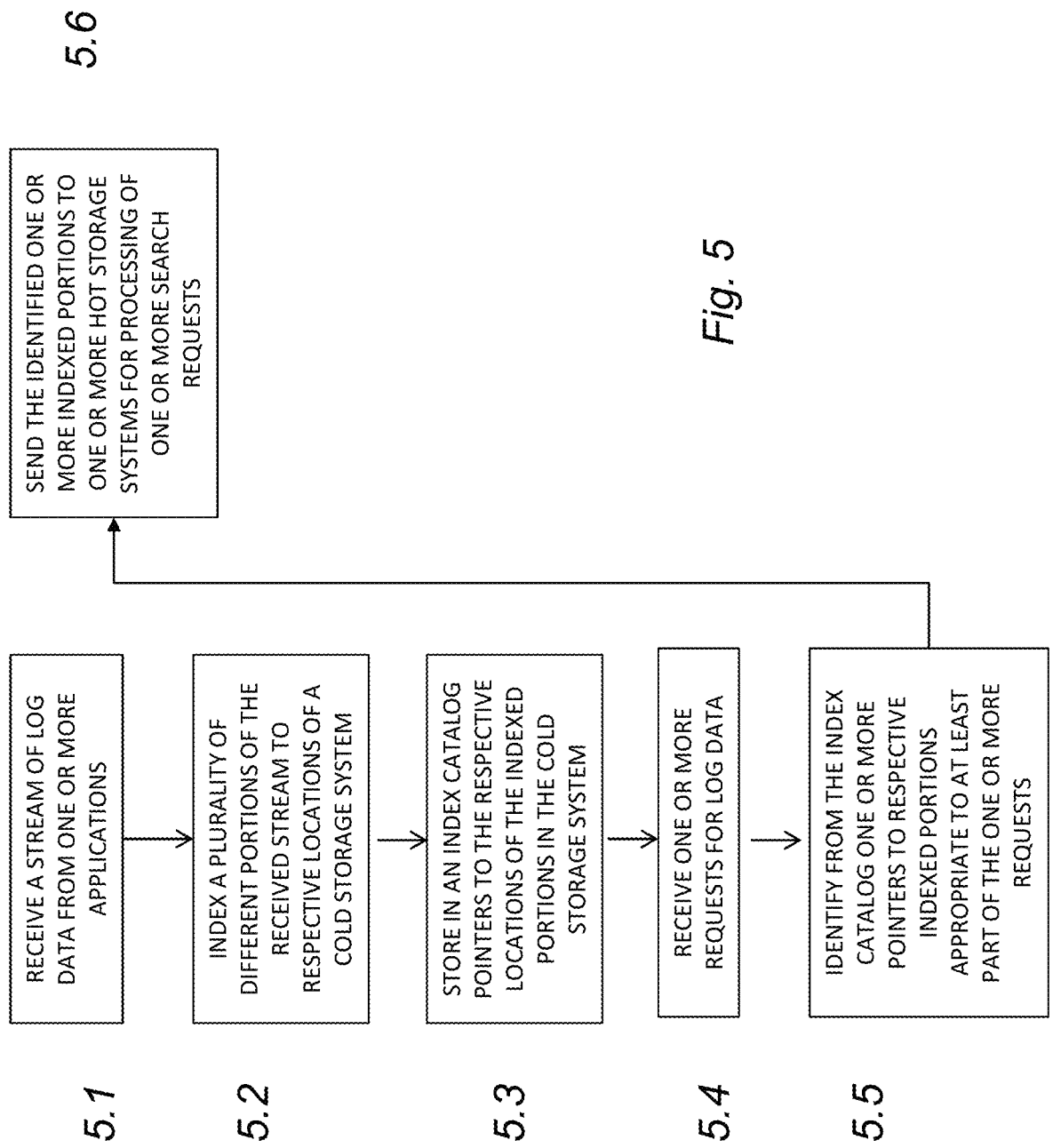

INDEXING AND RELAYING DATA TO HOT STORAGE

BENEFIT CLAIM

This application claims the benefit under 35 U.S.C. § 120 as a Continuation of U.S. patent application Ser. No. 18/138,492, filed on Apr. 24, 2023, which is a Continuation of U.S. patent application Ser. No. 17/518,407, filed on Nov. 3, 2021, now U.S. Pat. No. 11,669,507, issued on Jun. 6, 2023, which is a Continuation of U.S. patent application Ser. No. 16/003,548, filed Jun. 8, 2018, now U.S. Pat. No. 11,176,113, issued on Nov. 16, 2021, which claims the benefit under 35 U.S.C. § 119 of Great Britain Application No. 1807534.1, filed May 9, 2018, the entire contents of which are hereby incorporated by reference as if fully set forth herein. Applicant hereby rescinds any disclaimer of claim scope in the aforementioned prior applications or the prosecution history thereof and advises the USPTO that the claims in this application may be broader than any claim in the prior applications.

TECHNICAL FIELD

The present disclosure relates to methods and systems for indexing and searching, which may be considered individually or in combination. Example embodiments relate to the indexing and searching of telemetry or log information for computer applications and/or systems.

BACKGROUND

Telemetry data of system health and log data is a critical piece of infrastructure for any distributed, large-scale application. Telemetry is distributed systems' analog to Integrated Development Environments (IDEs) and debuggers for local development workflows and allows developers and Site Reliability Engineers (SREs) to understand performance, health and usage patterns of applications. Similarly, log data, or log files, record either events that occur in software applications or messages between different software applications or users. Similar to telemetry data, log data and log files provide an indication of system or application errors, performance, health and usage patterns of applications.

An end-to-end log production pipeline typically employs indexing nodes and a search Application Programming Interface (API). The indexing nodes read blocks of log lines from a log stream and index them in a cluster on hot storage. The log lines can be searched via the API which accesses the indexing nodes.

As the number of services and application deployments grow, so does the number of log lines requiring indexing and storing in hot storage. The use of hot storage is expensive and takes no account of standard search patterns, where only a limited amount of log data is needed most of the time, usually the most recent, yielding a poor cost/performance trade-off.

In this scenario, indexing and searching infrastructure is tightly coupled, making it difficult to scale these functions independently. Indexing and searching capabilities typically have very different and variable workloads; indexing is roughly constant whereas searching depends on the number of concurrent users, and search requests can spike depending on the time of day. An outage of the indexing capability may imply an outage of the search capability and vice versa.

SUMMARY

An embodiment provides a method, performed by one or more processors, the method comprising:
receiving a stream of log data from one or more applications;
indexing a plurality of different portions of the received stream to respective locations of a cold storage system;
storing, in an index, catalog pointers to the respective locations of the indexed portions in the cold storage system;
receiving one or more requests for log data;
subsequently identifying from the index catalog one or more pointers to respective indexed portions appropriate to at least part of the one or more requests; and
sending of the identified one or more indexed portions to one or more hot storage systems each associated with a respective search node for processing of one or more search requests.

Another embodiment provides a computer program, optionally stored on a non-transitory computer readable medium program which, when executed by one or more processors of a data processing apparatus, causes the data processing apparatus to carry out a method comprising:
receiving a stream of log data from one or more applications;
indexing a plurality of different portions of the received stream to respective locations of a cold storage system;
storing, in an index, catalog pointers to the respective locations of the indexed portions in the cold storage system;
receiving one or more requests for log data;
subsequently identifying from the index catalog one or more pointers to respective indexed portions appropriate to at least part of the one or more requests; and
sending of the identified one or more indexed portions to one or more hot storage systems each associated with a respective search node for processing of one or more search requests.

Another embodiment provides an apparatus configured to carry out a method according to any previous definition, the apparatus comprising one or more processors or special-purpose computing hardware.

BRIEF DESCRIPTION OF THE DRAWINGS

Example embodiments will now be described by way of non-limiting example with reference to the accompanying drawings, in which:

FIG. 5 is a flow diagram indicating processing operations performed by one or more processors of an appropriate computing system.

DETAILED DESCRIPTION OF CERTAIN EMBODIMENTS

Figure 1:
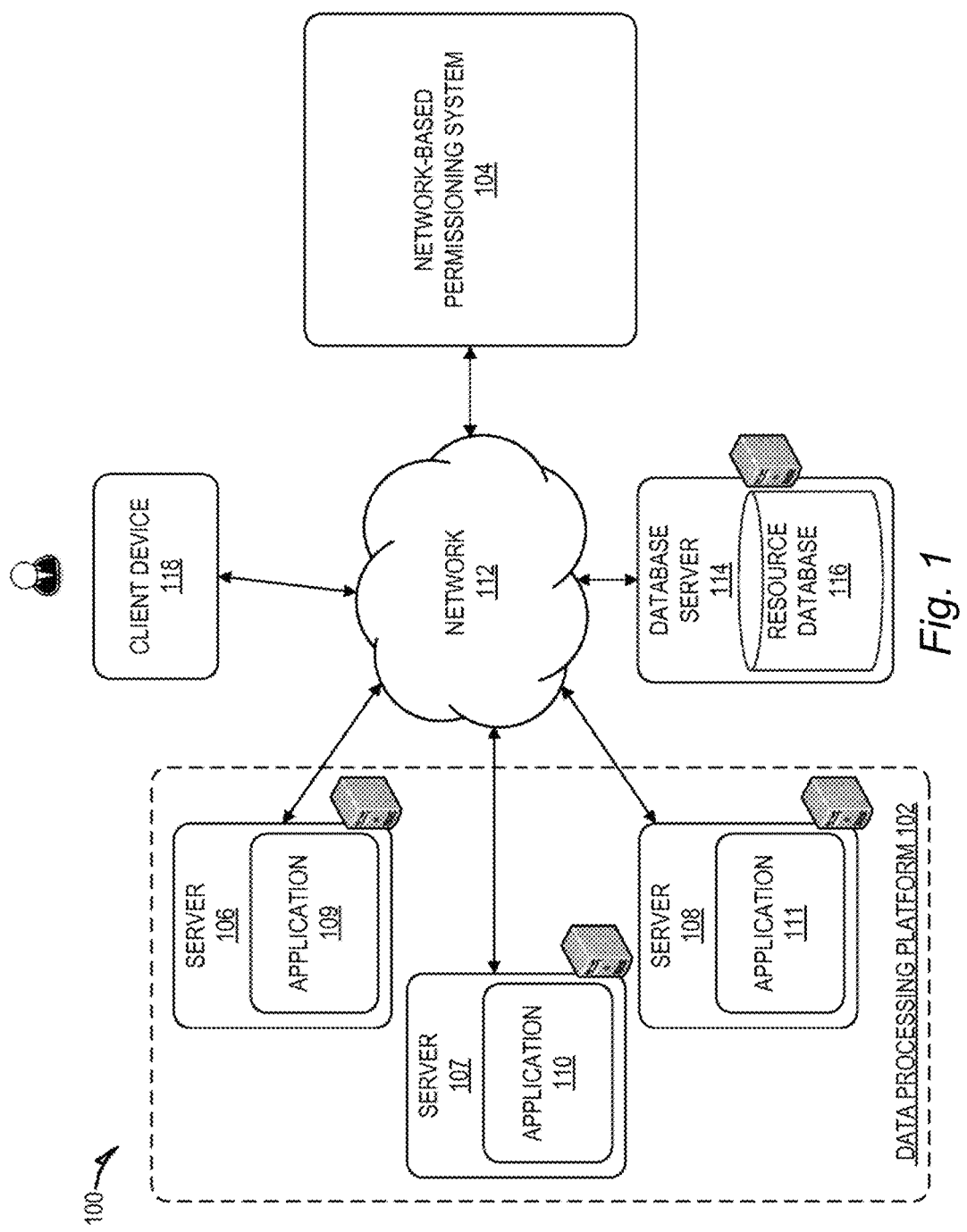
FIG. 1 is a network diagram depicting a network system comprising a data processing platform in communication with a network-based permissioning system.

Embodiments herein relate to data indexing and searching. Embodiments relate to methods and systems for performance of processing operations and an indexing and searching infrastructure. The methods and systems are particularly applicable and useful to large-scale distributed systems, for example where multiple applications or services are located and/or executed on multiple servers and/or at multiple locations. However, embodiments are also applicable to smaller systems.

For example, embodiments may relate to data indexing and searching of log data. Log data generally refers to data representing discretely identifiable portions or lines of information, automatically generated by hardware or software which reflect computational activities for use in, for example, debugging or system monitoring. In this context, telemetry data may also be covered by the term log data. For example, a server may automatically generate a server log consisting of the list of activities it has performed over time. Servers may produce log files according to a Common Log Format. For example, an application may automatically generate an application log consisting of the list of activities it has performed over time. Other examples exist.

Embodiments relating to data indexing and searching aspects can be considered separately or in combination. A feature of the embodiments is that searching and indexing processes are de-coupled, meaning that their functions may be handled separately and their respective infrastructure scaled up and down based on need or demand and performed independently of one another.

References to "logs" or "log data" can refer to any number of discrete data sets, lines or files representing individually generated logs.

Embodiments herein generally relate to the indexing of immutable log data, that is log data that is configured to be tamper-resistant and/or is not changed.

Embodiments herein generally relate to time-ordered log data, that is log data that is generated in general time-order. The log data may comprise, for each data set, line or file, a respective date and time indicative of its time-order.

Generally speaking, a log pipeline for a distributed network comprising multiple applications works as follows. Each service of an application may be responsible for adding logs that convey pivotal information regarding its state, progress, success, and failure conditions. For example, three aspects of log production across all services and applications may be formalized or standardized. First,

- each log level (e.g. WARN, INFO, ERROR, etc.) may be associated with semantics and alerting thresholds. For example, ERROR-level logs may trigger pager duty alerts to an affected team. Next, guidelines may be maintained explaining what type of information is acceptable to include in logs. For example, authentication tokens or passwords may never occur in logs. Finally, a JSON or similar format for structured logs, including fields like originating host, datetime, message, log level, log type, etc. may be specified. Libraries for commonly used languages (Java, Go, Python) transparently encode messages emitted from standard logging frameworks (e.g., SLF4J for Java services) into the JSON format.

JSON-formatted logs may be emitted to a file or standard output, depending on the environment. Per-service log collectors may pick up all logs and push them to a global stream (e.g. on AP ACHE KAFKA or AMAZON KINESIS).

Before indexing logs from the global stream, the logs may be filtered using whitelists and blacklists. Only a defined set of environments on the whitelist may be allowed to submit logs, and logs must conform to syntax and content restrictions. Since a log schema may evolve over time, logs may be harmonized with different schema versions by mapping them to the latest supported schema.

The filtered and standardized logs may subsequently be indexed. Indexing may be performed in anticipation of typical search workloads. An index of the full-text log message and all of the structured fields, including datetime, log type, error level, originating host and environment, etc. may be built.

Developers and SREs may then search or query indexed logs via a custom User Interface (UI) or through Application Programming Interfaces (APIs).

For example, a user may search or query a live stream of all logs from some service or environment, e.g. logs containing a token, or string or logs corresponding to a call trace id, etc.

The ability to search logs means that developers can understand system or service states, and/or investigate their causes. For example, if an error is signaled, a developer may search for API calls against the service which triggered the error state as evidenced by an error log entry.

In the context of the following, the following definitions apply.

A data processing platform is any computing platform on which executable code, or software, may be executed, providing particular functionality and restrictions, in that low-level functionality is provided which the executable code needs to conform to.

A data resource is any form of executable software, data set, or data structure usually, but not exclusively for providing a service, for example a data analysis application, a data transformation application, a report generating application, a machine learning process, a spreadsheet or a database. A data resource may be created, viewed and/or edited or executed, for example via a data processing pipeline management tool A data repository is any form of data storage entity into which data is specifically partitioned or isolated.

Log data, log files or logs generally refer to data representing discretely identifiable portions or lines of information, automatically generated by hardware or software which reflect computational activities for use in, for example, debugging or system monitoring. In this context, telemetry data may also be covered by the term log data. For example, a server may automatically generate a server log consisting of the list of activities it has performed over time. Servers may produce log files according to a Common Log Format.

Hot and cold storage refer to any data storage hardware or mechanisms that are, respectively, quicker and slower to read data from (in relative terms). For example, cold storage may comprise memory that is remote from the requesting system or service, e.g. on the cloud, whereas hot storage may be less remote or more local to the requesting system or service. Additionally, or alternatively, cold storage may use a slower technology than hot storage. For example, hot storage may comprise solid-state memory, e.g. flash or NAND flash memory, or developing technologies such as such as phase-change RAM (PRAM), ferroelectric RAM (FERAM), magneto resistive RAM (MRAM), and resistance-change RAM (RRAM). Cold storage may comprise relatively slower technologies, such as mechanical disc drives or slower solid-state technology. Additionally, or alternatively, hot storage and cold storage may be distinguished by their access mechanisms. Additionally, or alternatively, hot storage and cold storage may be distinguished by their relative cost. Hot storage is generally more expensive than cold storage for a corresponding amount of storage space.

An execution environment is any representation of an execution platform, such as an operating system or a database management system.

A dataset, sometimes used interchangeably with data; a dataset holds data on the data processing platform, and usually has an accompanying schema for the dataset in order to make sense, or interpret, the data within the dataset.

The data processing platform may be an enterprise software platform associated with an enterprise platform provider. An enterprise software platform enables use by multiple users, internal and external to the enterprise platform provider. The users may be users of different respective organisations, such as different commercial companies.

The data resources stored on the software platform, which may comprise data transformers forming part of a product pipeline, may relate to technical data and/or technical processes.

For example, in a financial organisation, it may be required to identify a list of suspicious customers by processing raw accounts, transactions and customer data in a particular order in order first to provide clean versions of the raw datasets (removing unwanted or unnecessary fields of the datasets to make data processing more efficient) and then to identify suspicious transactions which may for example be above a certain monetary amount. By correlating customer data with the suspicious transactions data, suspicious customers may be identified. This is given by way of a simple example, and will be explained further in relation to one of the embodiments below.

For example, an engine manufacturer may create and store a database relating to spare parts for the different models of engines it produces and services. The database may, for example, be a multi-dimensional relational database. Certain analyses may be performed on the database using another application, for example an executable application resource for analysing and/or transforming the data in order to identify trends which may be useful for predicting when certain parts will fail and/or need.

For this purpose, the software platform may comprise enterprise applications for machine-analysis of data resources. For example, an organisation may store on the software platform history data for a machine and use an enterprise application for the processing of history data for the machine in order to determine the probability, or a risk score, of the machine, or a component sub-system of the machine, experiencing a fault during a future interval. The enterprise application may use the fault probabilities or risk scores determined for a machine to select a preventative maintenance task which can reduce the probability and/or severity of the machine experiencing a fault. History data for a machine may include sensor logs, a sensor log being multiple measurements of physical parameters captured by a sensor and relating to different points in time (a time series). History data for a machine may also include computer readable logs such as maintenance logs, fault logs and message logs corresponding to a machine. The maintenance log corresponding to the machine may record information such as dates and locations of prior maintenance tasks, details of replacement parts, free text notes made by an engineer or mechanic performing a maintenance task and so forth. The fault log corresponding to the machine may record information such as dates and locations of faults, the types of faults, the period of time required to rectify each fault and so forth. The message log corresponding to a machine, such as a ship or construction machinery, may records messages generated by controllers, processors or similar devices which are integrated into the component sub-systems of the machine. The messages may include a date and time, an identifier of a component sub-system, and message content such as, for example, warning information of information identifying a fault.

A production pipeline is a set of data elements connected in series, where the output of a first element is the input of a second element. One or more other data elements may be connected to the input of the first or second elements. Some data elements may be performed in parallel, at least partially. Some data elements may perform a task or a part of a larger task when combined with others.

Certain data elements may be data sets, which may be raw data or processed data. In this case, the data sets may be represented in any suitable form, for example as database tables comprising one or more rows and columns. The data sets may represent technical data, e.g. data representing sensed or measured data from physical sensors in an industrial setting or of a machine such as vehicle or craft. The data sets may represent inventory data. The data sets may represent pixels of an image. The data sets may represent financial data. Many other examples of what the data sets represent are envisaged.

Certain data elements may relate to tasks, or part of a larger task, which define a relationship between at least a first data element and a second data element, for example between one or more input data elements and one or more output data elements. The tasks may be performed using data processing elements, to be mentioned below, and may involve transforming the data in some way to achieve the defined relationship.

A production pipeline is fundamentally used to structure workflows done on complex tasks that may have dependencies, e.g. the data from an industrial sensor may be required before a further task is performed, although this may not be essential.

Data processing elements for performing tasks, or part of a larger task, may perform a relatively simple operation, such as removing certain types of data from a received data element, e.g. a particular column and/or row from a received table, combining two or more received tables or certain rows and/or columns thereof, performing a unit conversion operation on data to produce other data in the same units, shifting data and so on. Data processing elements may also perform more complex tasks by receiving or being applying user inputted code, such as Java, Python, or structured query language (SQL), for example to run a program of computer-readable instructions for transforming the one or more received data elements into a different form or to produce the result of a combination or calculation. Data processing elements may be executed in series, in parallel or in time-sliced fashion possibly with buffer storage between elements.

Particular embodiments will now be described with reference to the Figures.

FIG. 1 is a network diagram depicting a network system 100 comprising a data processing platform 102 in communication with a network-based permissioning system 104 (hereafter "permissioning system") configured for registering and evaluating access permissions for data resources to which a group of application servers 106-108 share common access, according to an example embodiment. Consistent with some embodiments, the network system 100 may employ a client-server architecture, though the present subject matter is, of course, not limited to such an architecture, and could equally well find application in an event-driven, distributed, or peer-to-peer architecture system, for example. Moreover, it shall be appreciated that although the various functional components of the network system 100 are discussed in the singular sense, multiple instances of one or more of the various functional components may be employed.

The data processing platform 102 includes a group of application servers, specifically, servers 106-108, which host network applications 109-111, respectively. The network applications 109-111 hosted by the data processing platform 102 may collectively compose an application suite that provides users of the network system 100 with a set of related, although independent, functionalities that are accessible by a common interface. For example, the network applications 109-111 may compose a suite of software application tools that can be used to analyse data to develop various insights about the data, and visualize various metrics associated with the data. To further this example, the network application 109 may be used to analyse data to develop particular metrics with respect to information included therein, while the network application 110 may be used to render graphical representations of such metrics. It shall be appreciated that although FIG. 1 illustrates the data processing platform 102 as including a particular number of servers, the subject matter disclosed herein is not limited to any particular number of servers and in other embodiments, fewer or additional servers and applications may be included.

The applications 109-111 may be associated with a first organisation. One or more other applications (not shown) may be associated with a second, different organisation. These other applications may be provided on one or more of the application servers 106, 107, 108 which need not be specific to a particular organisation. Where two or more applications are provided on a common server 106-108 (or host), they may be containerised which as mentioned above enables them to share common functions.

Each of the servers 106-108 may in communication with the network-based permissioning system 104 over a network 112 (e.g. the Internet or an intranet). Each of the servers 106-108 are further shown to be in communication with a database server 114 that facilitates access to a resource database 116 over the network 112, though in other embodiments, the servers 106-108 may access the resource database 116 directly, without the need for a separate database server 114. The resource database 116 may stores other data resources that may be used by any one of the applications 109-111 hosted by the data processing platform 102.

In other embodiments, one or more of the database server 114 and the network-based permissioning system 104 may be local to the data processing platform 102; that is, they may be stored in the same location or even on the same server or host as the network applications 109, 110, 111.

As shown, the network system 100 also includes a client device 118 in communication with the data processing platform 102 and the network-based permissioning system 104 over the network 106. The client device 118 communicates and exchanges data with the data processing platform 102.

The client device 118 may be any of a variety of types of devices that include at least a display, a processor, and communication capabilities that provide access to the network 106 (e.g., a smart phone, a tablet computer, a personal digital assistant (PDA), a personal navigation device (PND), a handheld computer, a desktop computer, a laptop or netbook, or a wearable computing device), and may be operated by a user (e.g., a person) to exchange data with other components of the network system 100 that pertains to various functions and aspects associated with the network system 100 and its users. The data exchanged between the client device 118 and the data processing platform 102 involve user-selected functions available through one or more user interfaces (UIs). The UIs may be specifically associated with a web client (e.g., a browser) or an application 109-111 executing on the client device 118 that is in communication with the data processing platform 102. For example, the network-based permissioning system 104 provides user interfaces to a user of the client device 118 (e.g., by communicating a set of computer-readable instructions to the client device 118 that cause the client device 118 to display the user interfaces) that allow the user to register policies associated with data resources stored in the resource database 116.

Figure 2:
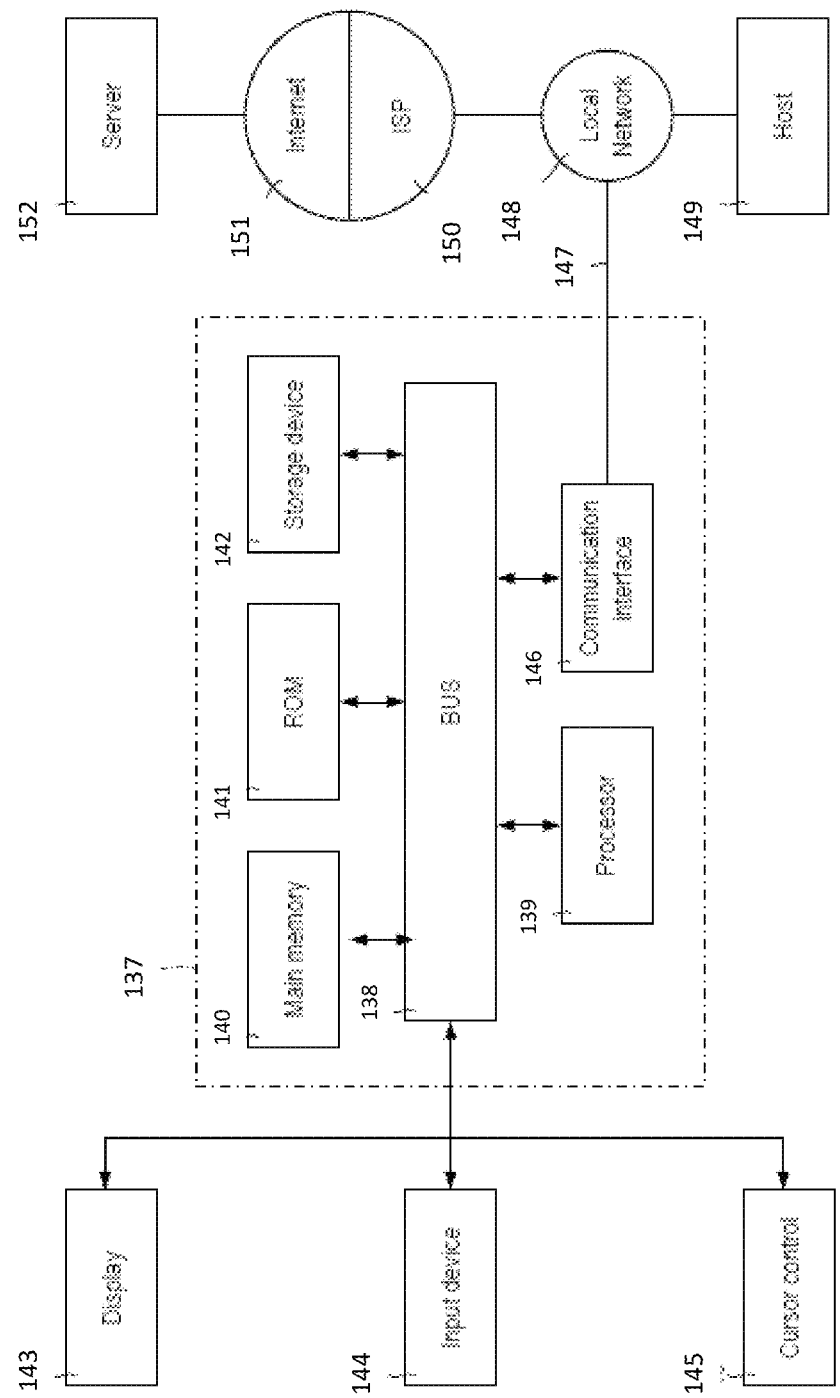
FIG. 2 is a block diagram of a computer system according to embodiments of this specification.

Referring to FIG. 2, a block diagram of an exemplary computer system 137, which may comprise the data processing platform 102, one or more of the servers 106-108, the database server 114 and/or the network-based permissioning system 104, consistent with examples of the present specification is shown.

Computer system 137 includes a bus 138 or other communication mechanism for communicating information, and a hardware processor 139 coupled with bus 138 for processing information. Hardware processor 139 can be, for example, a general purpose microprocessor. Hardware processor 139 comprises electrical circuitry.

Computer system 137 includes a main memory 140, such as a random access memory (RAM) or other dynamic storage device, which is coupled to the bus 138 for storing information and instructions to be executed by processor 139. The main memory 140 can also be used for storing temporary variables or other intermediate information during execution of instructions by the processor 139. Such instructions, when stored in non-transitory storage media accessible to the processor 139, render the computer system 137 into a special-purpose machine that is customized to perform the operations specified in the instructions.

Computer system 137 further includes a read only memory (ROM) 141 or other static storage device coupled to the bus 138 for storing static information and instructions for the processor1 139. A storage device 142, such as a magnetic disk or optical disk, is provided and coupled to the bus 138 for storing information and instructions.

Computer system 137 can be coupled via the bus 138 to a display 143, such as a cathode ray tube (CRT), liquid crystal display, or touch screen, for displaying information to a user. An input device 144, including alphanumeric and other keys, is coupled to the bus 138 for communicating information and command selections to the processor 139. Another type of user input device is cursor control 145, for example using a mouse, a trackball, or cursor direction keys for communicating direction information and command selections to the processor 139 and for controlling cursor movement on the display 143. The input device typically has two degrees of freedom in two axes, a first axis (for example, x) and a second axis (for example, y), that allows the device to specify positions in a plane.

Computer system 137 can implement the techniques described herein using customized hard-wired logic, one or more ASICs or FPGAs, firmware and/or program logic which in combination with the computer system causes or programs computer system 137 to be a special-purpose machine. According to some embodiments, the operations, functionalities, and techniques disclosed herein are performed by computer system 137 in response to the processor 139 executing one or more sequences of one or more instructions contained in the main memory 140. Such instructions can be read into the main memory 40 from another storage medium, such as storage device 142. Execution of the sequences of instructions contained in main memory 140 causes the processor 139 to perform the process steps described herein. In alternative embodiments, hard-wired circuitry can be used in place of or in combination with software instructions.

The term "storage media" as used herein refers to any non-transitory media that stores data and/or instructions that cause a machine to operate in a specific fashion. Such storage media can comprise non-volatile media and/or volatile media. Non-volatile media includes, for example, optical or magnetic disks, such as storage device 142. Volatile media includes dynamic memory, such as main memory 140. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from, but can be used in conjunction with, transmission media. Transmission media participates in transferring information between storage media. For example, transmission media includes coaxial cables, copper wire and fibre optics, including the wires that comprise bus 138. Transmission media can also take the form of acoustic or light waves, such as those generated during radio-wave and infra-red data communications.

Various forms of media can be involved in carrying one or more sequences of one or more instructions to processor 139 for execution. For example, the instructions can initially be carried on a magnetic disk or solid state drive of a remote computer. The remote computer can load the instructions into its dynamic memory and send the instructions over a telephone line or other transmission medium using a modem. A modem local to computer system 137 can receive the data on the telephone line or other transmission medium and use an infra-red transmitter to convert the data to an infra-red signal. An infra-red detector can receive the data carried in the infra-red signal and appropriate circuitry can place the data on bus 138. Bus 138 carries the data to the main memory 140, from which the processor 139 retrieves and executes the instructions. The instructions received by the main memory 140 can optionally be stored on the storage device 142 either before or after execution by the processor 139.

Computer system 137 also includes a communication interface 146 coupled to the bus 138. The communication interface 146 provides a two-way data communication coupling to a network link 147 that is connected to a local network 148. For example, the communication interface 146 can be an integrated services digital network (ISDN) card, cable modem, satellite modem, or a modem to provide a data communication connection to a corresponding type of telephone line. As another example, the communication interface 146 can be a local area network (LAN) card to provide a data communication connection to a compatible LAN. Wireless links can also be implemented. In any such implementation, the communication interface 146 sends and receives electrical, electromagnetic or optical signals that carry digital data streams representing various types of information.

The network link 147 typically provides data communication through one or more networks to other data devices. For example, the network link 147 can provide a connection through the local network 148 to a host computer 149 or to data equipment operated by an Internet Service Provider (ISP) 150. The ISP 150 in turn provides data communication services through the world wide packet data communication network now commonly referred to as the "Internet" 151. The local network 148 and internet 151 both use electrical, electromagnetic or optical signals that carry digital data streams. The signals through the various networks and the signals on the network link 147 and through the communication interface 146, which carry the digital data to and from the computer system 137, are example forms of transmission media.

The computer system 137 can send messages and receive data, including program code, through the network(s), network link 147 and communication interface 146. For example, a first application server 106 may transmit data through the local network 148 to a different application server 107, 108.

Any one or more of the data processing platform 102, servers 106-108, 114 may automatically generate logs, the applications 109-111 may automatically generate logs, and the network-based permissioning system 104 may automatically generate a log. The logs may conform to a predetermined syntax and/or schema and each platform, server, application or other system may use the same syntax/schema or different syntax/schema.

Embodiments herein relate to the indexing and also searching of such logs which may be useful for identifying and debugging errors or other anomalies.

Figure 3:
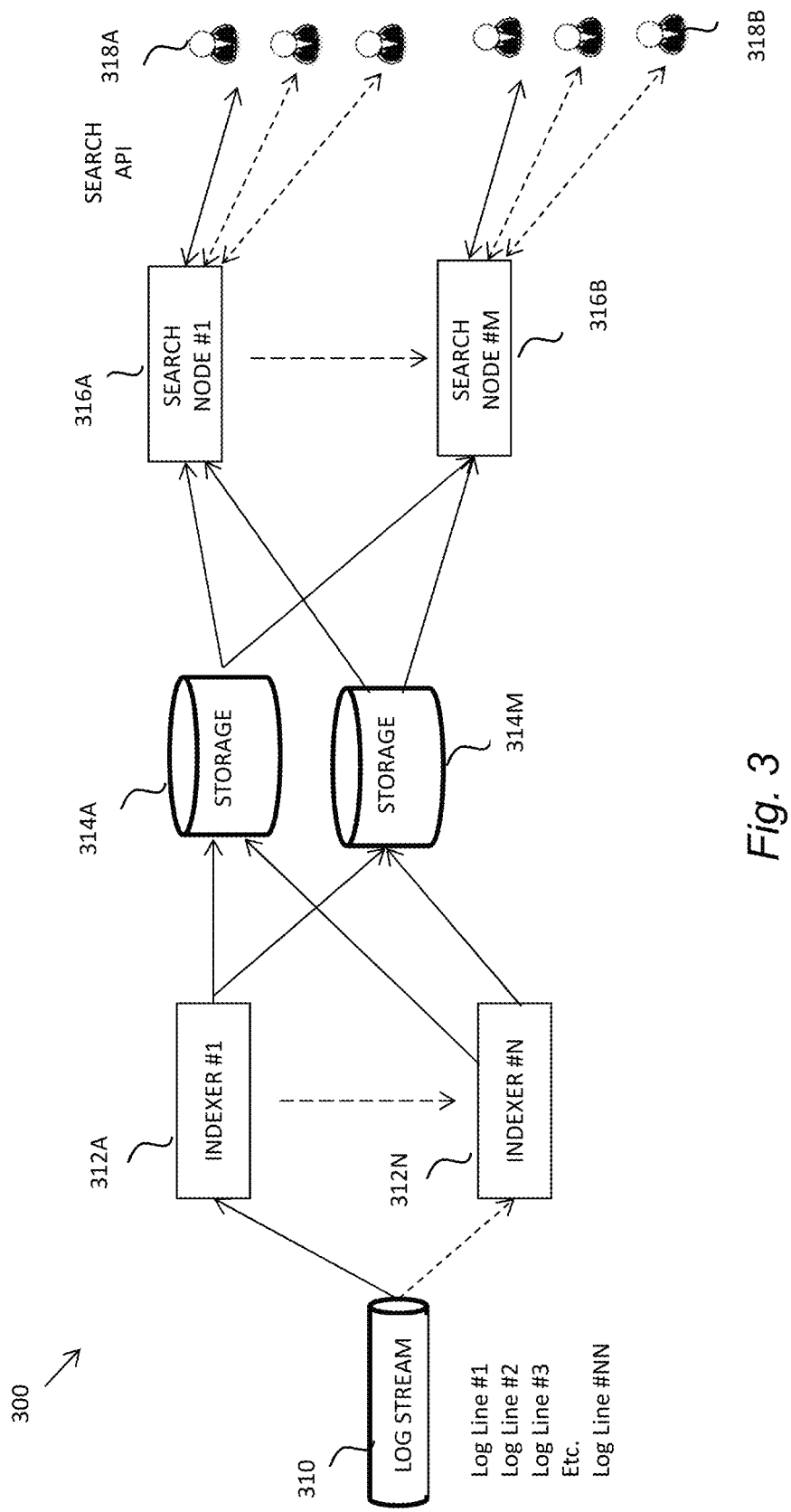
FIG. 3 is a first indexing and searching system or architecture.

FIG. 3 is a schematic block diagram of a first indexing and searching system or architecture 300. The system 300 may be implemented on hardware, software or a combination thereof. The system 300 may be provided on one or more of the servers 106-108, 114, or another server. The system 300 may be distributed among a plurality of the servers 106-108, 114.

The system 300 may receive a log stream 310, which may, for example, use known systems such as APACHE KAFKA or AMAZON KINESIS. The log stream 310 represents a stream of logs received from one or multiple distributed applications. The logs may therefore comprise logs from different applications which are interleaved within the log stream 300.

One or more indexers or indexing nodes 312A, 312N may be provided, which are processing nodes for allocating portions or clusters of the log stream 310 to one or more local storage systems 314A—314M, which may be considered hot storage systems in that they are local and fast access speeds are needed. The indexing nodes 312A—312N may generate metadata for each cluster.

One or more search nodes 316A—316M may be provided, which are processing nodes for effecting search requests received through a search API exposed to one or more users or groups of users 318A—318B at their respective user terminals. Users 318A—318B may be remote from the system 300 and use any type of user terminal. Their number can vary greatly. Received search requests are processed by the search nodes 316A—316M and relevant logs are identified in the storage systems 314A—314M and displayed as an accessible list on the search API to the appropriate users 318A—318B. Relevant logs may be retrieved in the usual manner by clicking a link in the accessible list.

An example off-the-shelf system for implementing the shown system 300 is Elasticsearch.

Limitations of the system 300 include the fact that the indexing and search nodes 312A—312N, 316A—316B are coupled; their respective workloads share the same infrastructure and thus cannot be scaled independently to deal with varying workloads. Indexing and searching typically have very different workload characteristics; indexing loads are relatively constant as they are a function of the size of the log-generating applications and services. Search loads depend on the number of concurrent users 318A—318B and may thus spike as a function of time-of-day and the day of the week. Further, an outage in any part of the system 300, such as an outage of the indexing nodes 312A—312N implies an outage on the searching nodes 316A—316B and vice versa.

Indexing and search throughput cannot be scaled dynamically. For example, if we assume that an indexing cluster is sized such that the steady-state indexing workload is handled at 75% of the maximum throughput, a planned or unplanned outage of x minutes may require 3× minutes for the indexing nodes 312A—312N to catch up. It is not straightforward to increase throughput of the indexing nodes 312A—312N by adding additional temporary memory capacity to common storage systems 314A—314M.

Additionally, as the number of applications and services grow, so will the number and/or rate of logs received from the log stream 310, requiring time consuming management activities.

Figure 4:
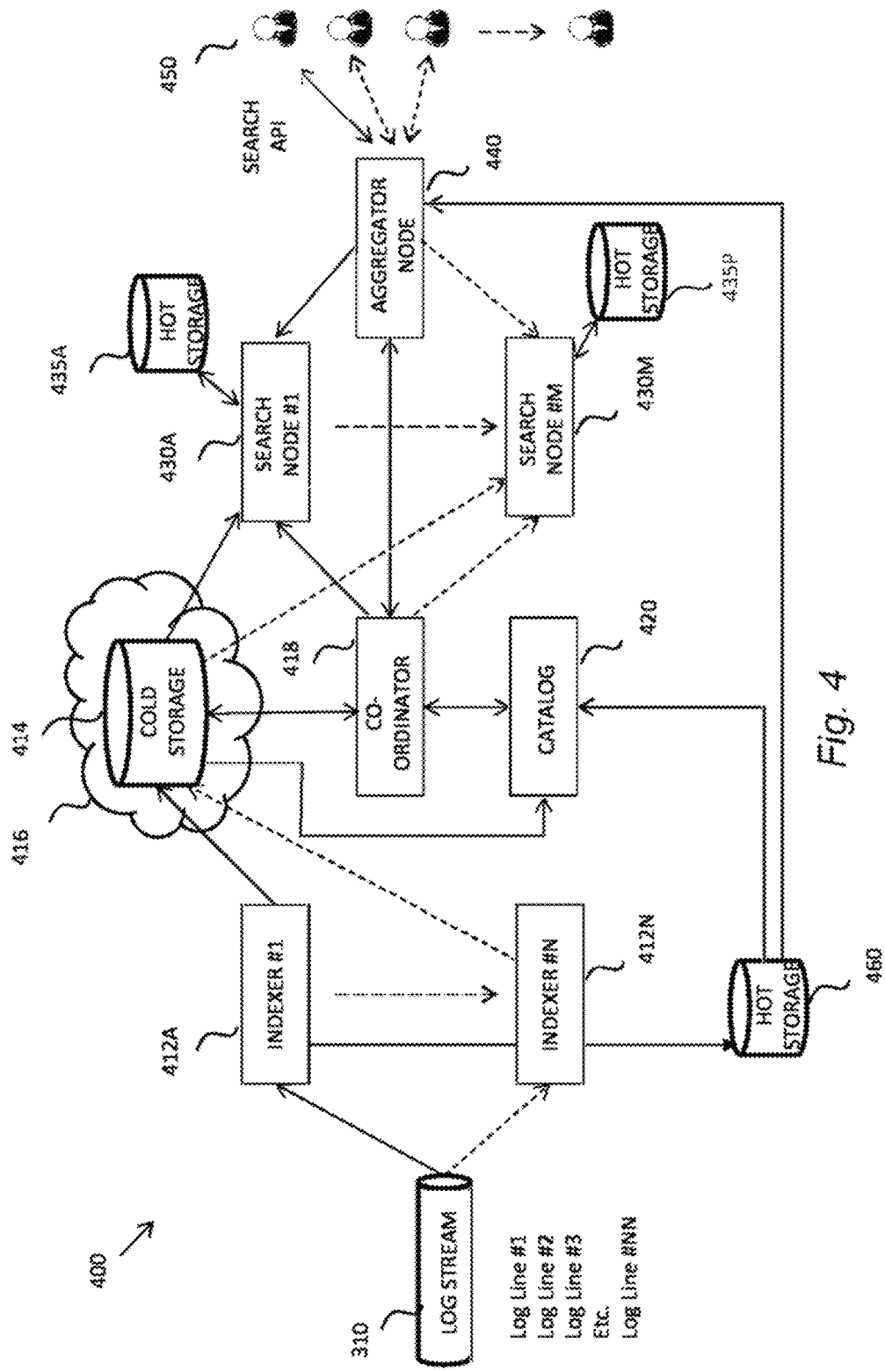
FIG. 4 is a schematic block diagram of a second indexing and searching system or architecture.

FIG. 4 is a schematic block diagram of a second indexing and searching system or architecture 400, according to an example embodiment. The second system 400 may be implemented on hardware, software or a combination thereof. The system 400 may be provided on one or more of the servers 106-108, 114, or another server. The system 400 may be distributed among a plurality of the servers 106-108, 114.

The system 400 may receive the log stream 310, as before, which for example may for example use known systems such as AP ACHE KAFKA or AMAZON KINESIS, producing a sharded log stream. The log stream 310 represents a stream of logs received from one or multiple distributed applications. The logs may therefore comprise logs from different applications which are interleaved within the log stream 310.

One or more indexers or indexing nodes 412A, 412N may be provided, which are processing nodes for allocating portions or clusters of the log stream 310 to one or more cold storage systems 414. The one or more cold storage systems 414 may be provided remotely, e.g. in the cloud 416, or may comprise relatively cheap, slower memory than the one or more memory systems 314A-314M shown in FIG. 3.

The one or more indexing nodes 412A-412N are configured to receive the log stream 310 in generally time-ordered fashion, produce time and/or space-bounded portion (e.g. the minimum of 1 hour and/or 10 GBytes) which are then indexed and stored in the cold storage system 414. The index may be a Lucene index, for example. Whilst logs are being received from the log stream 310, and before the portion is complete, the logs may be temporarily stored in local hot storage 460 for quick access, which takes account of the probability that more recent logs are more likely to be searched for. When the portion is complete, i.e. the time and/or space bound is reached, then the logs in the local hot storage 460 may be moved to the cold storage system 414 and the hot storage may be deleted or overwritten by fresh log data.

The schema of log data may be known, and hence static mapping may be used from fields to the index configuration, e.g. how to tokenise, what data types to use, etc. When the time and/or space bound is reached, the one or more indexing nodes 412A-412N may push (and optionally compress) the index portion to the cold storage system 414 and generate metadata for the portion, including a pointer to the indexed portion, which metadata is stored in an index catalog module 420. The metadata may further comprise data contained within one or more fields of the logs in the indexed portion, such as defined in the schema. The one or more indexing nodes 412A-412N may then commit the position in the log stream 310 and repeat the above process with a fresh, empty index.

The index catalog module 420 may be configured to store the list of indexed portions as a pointer to the corresponding location in the cold storage system 414, as well as the other metadata, which may include log type, index start/end date etc. The index catalog module 420 should be a durable system, and one example product used for this purpose may be APACHE KAFKA or AMAZON KINESIS. Logs that are being temporarily stored in the local hot storage 460 may also be indexed in the index catalog module 420 in the same or a similar way, such that they are searchable.

The system 400 may further comprise one or more search nodes 430A-430M. Each search node 430A-430M may be configured to serve a subset of the indexed portions responsive to user search requests. The one or more search nodes 430A-430M may communicate with a search coordinator module 418 for this purpose. The one or more search nodes 430A-430M have one or more associated hot storage systems 435A-435P, meaning that received log portions retrieved from the cold storage system 414 are available for further processing of received search requests in a timely fashion.

The search coordinator module 418 is configured to keep track of the available search nodes 430A-430M and manages the allocation of relevant indexed portions to particular search nodes. If the log data is immutable, i.e. it is tamper-resistant, it is acceptable for multiple search nodes 430A-430M to serve the same indexed portion without requiring complex synchronisation logic.

In general, it is possible for multiple search nodes 430A-430M to receive the same allocation of one or more indices, i.e. so that multiple search nodes can serve same or similar requests. This improves performance, and may protect against search node 430A-430M failure because there will be another node serving the same portion, e.g. shard, of the index.

The search coordinator module 418 is generally responsible for receiving search requests from one or more users 450, received through a search API that may be exposed by the search nodes 430A-430M (or an associated aggregator node 440, mentioned below), and to identify from the index catalog module 420 the location of relevant indexed portions. Relevant indexed portions may be determined based on criteria such as the timing of the logs, an application ID, system ID, server ID, type of log data or any similar data enabling identifying of a subset of all portions of log data in the cold storage system 414 and/or the local hot storage 460. The search coordinator module 418 may receive one or more pointers to the relevant indexed portions and fetch said indexed portions from the cold storage system 414 or the local hot storage 460. The search coordinator module 418 then sends said indexed portions to the appropriate search node 430A-430M for processing the search query for displaying results through the search API.

An aggregator node 440 may also be provided. The aggregator node 440 is configured to expose a Remote Procedure Call (RPC) query API, e.g. HTTP or JSON or protobuf, and forwards received search query requests to the one or more search nodes 430A—430M. The aggregator node 440 may also learn from the search coordinator module 418 which of the search nodes 430A-430M currently serve which indexed portions, which may be relevant to a new search query, for example with respect to the log type and/or the time window of the query. Hence, if it is possible to process a new search query based on what data portions are currently held on hot storage associated with the one or more search nodes 430A-430M, there is no need to fetch the data portions from the cold storage system 414, saving time and bandwidth.

The aggregator node 440 may implement an appropriate query language, including forwarding filter queries, applying limits to aggregated query results and de-duplicating data.

In overview, the operation of the system 400 is explained with reference to FIG. 5, which is a flow diagram indicating processing operations performed by one or more processors of an appropriate computing system, for example using the system shown in FIG. 2.

A first operation 5.1 may comprise receiving a stream of log data from one or more applications.

Another operation 5.2 may comprise indexing a plurality of different portions of the received stream to respective locations of a cold storage system.

Another operation 5.3 may comprise storing, in an index, catalog pointers to the respective locations of the indexed portions in the cold storage system.

Another operation 5.4 may comprise receiving one or more requests for log data.

Another operation 5.5 may comprise subsequently identifying from the index catalog one or more pointers to respective indexed portions appropriate to at least part of the one or more requests.

Another operation 5.6 may comprise sending of the identified one or more indexed portions to one or more hot storage systems each associated with a respective search node for processing of one or more search requests.

It will be appreciated that certain operations may be omitted or reordered in some embodiments.

As explained, the indexing may be performed by a plurality of indexing nodes, operating independently from the one or more search nodes, for indexing different portions of the received stream. The number of indexing nodes may adaptively increase and/or decrease in dependence on the amount or rate of log data in the received stream. The indexed log data may be immutable. That is, the system 400 never updates logs when produced or indexed. This means that the main driver of the coordination and synchronisation in other systems vanishes and the interactions points between indexing and searching can be simplified whilst maintaining consistency. By precomputing search indices and storing them in relatively cheap, cold storage, they can be subsequently loaded into search nodes 430A-430M with hot storage to answer queries.

It will be appreciated that the system 400 can provide decoupling of indexing and searching operations into separate phases. Indexing nodes 412A-412N consume the log stream 310 and produce bounded portions or indices which are pushed into cold storage 414. The scaling of the indexing nodes 412A-412N can be performed independently of the scaling of searching nodes 430A-430M without affecting the infrastructure or performance of the system 400.

Other operations may comprise determining which of a plurality of search nodes to send the identified one or more indexed portions to. The determination may be based on available capacity of the hot storage system associated with each search node.

Other operations may comprise allocating and/or de-allocating one or more search nodes for receiving and processing the one or more search requests based on a variable parameter. For example, the allocating and/or de-allocating may be based on one one or more of number of search requests received over a predetermined time period and/or the time for which the sent indexed portions have been stored at the one or more search nodes.

Other operations may comprise de-duplicating search results. Because logs are immutable, it is relatively straight-forward to de-duplicate search results by their intrinsic ID, which may be a hash of the log record. A need for de-duplication may be evident from the following example situation. Consider that one of the indexing nodes 412A-412N successfully pushes an index portion to the cold storage system 414 and registers it with the index catalog module 420. However, the stream commit fails. Then, a different indexer node may pick up the same logs from the log stream 310 and pass them as an additional, partially duplicative portion. This pattern is not unique to log indexing workflows or even the presented architecture. Processing in distributed systems requires either coordinated transactions with a commit protocol, or idempotent downstream processing. However, when using immutable log records, the latter option is simple to implement.

Further, aggregation queries like count(Q) pose additional challenges in the presence of duplicated records. It is not possible to push the aggregation operation from the aggregation node 440 to the search nodes 430A-430M without jeopardizing correctness. The system 400 and method offer a number of possible modes for computing such aggregates. For example, a faster, approximate mode may be provided by pushing aggregations to the search nodes 430A—430M and summing their resulting counts. A slower, more exact mode may be provided by retrieving record IDs of all Q-results, followed by a de-duplication step and a count step.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A method of processing search requests for log data, comprising:
  receiving, from one or more search nodes of a distributed system, one or more requests for log data,
  the one or more search nodes being associated with one or more first storage systems local to the one or more search nodes;
  identifying, from an index catalog, an indexed portion of the log data and a location where the indexed portion is stored within a second storage system of one or more second storage systems separate from the one or more first storage systems based on a particular request of the one or more requests,
  the log data being indexed by one or more indexing nodes independently from the one or more requests being received and processed by the one or more search nodes;
  changing a first number of the one or more search nodes and updating a second number of the one or more indexing nodes independently,
  wherein the method is performed using one or more processors.

2. The method of claim 1, further comprising sending the indexed portion to at least one search node of the one or more search nodes, in response to the particular request, for storage in the associated at least one first storage system.

3. The method of claim 2, further comprising:
  tracking availability of the indexed portion of the log data in the at least one first storage system;
  receiving a new request for the log data;
  serving the new request with a part of the log data in the at least one first storage system.

4. The method of claim 2, the sending comprising:
  fetching the indexed portion from the second storage system;
  de-duplicating the indexed portion.

5. The method of claim 2, the changing being performed based on a number of requests for the log data received over a period of time or an amount of time for which indexed portions have been stored at the at least one first storage system.

6. The method of claim 1, the one or more first storage systems offering quicker data access than the one or more second storage systems.

7. The method of claim 1, the particular request identifying timing of the log data, a type of the log data, an application, a system, or a server.

8. The method of claim 1, the updating being performed based on an amount or a streaming rate of the log data.

9. The method of claim 1, the log data being immutable to the one or more search nodes.

10. The method of claim 1, the receiving comprising accepting, via the one or more search nodes, the one or more requests for log data from an aggregator node that exposes a remote procedure call application programming interface.

11. A computer system for processing search requests for log data, comprising:
  a memory;
  one or more processors coupled to the memory and configured to perform:
    receiving, from one or more search nodes of a distributed system, one or more requests for log data,
    the one or more search nodes being associated with one or more first storage systems local to the one or more search nodes;
    identifying, from an index catalog, an indexed portion of the log data and a location where the indexed portion is stored within a second storage system of one or more second storage systems separate from the one or more first storage systems based on a particular request of the one or more requests,
    the log data being indexed by one or more indexing nodes independently from the one or more requests being received and processed by the one or more search nodes;
    changing a first number of the one or more search nodes and updating a second number of the one or more indexing nodes independently.

12. The computer system of claim 11, the one or more processors further configured to perform sending the indexed portion to at least one search node of the one or more search nodes, in response to the particular request, for storage in the associated at least one first storage system.

13. The computer system of claim 12, the one or more processors further configured to perform:
  tracking availability of the indexed portion of the log data in the at least one first storage system;
  receiving a new request for the log data;
  serving the new request with a part of the log data in the at least one first storage system.

14. The computer system of claim 12, the sending comprising:

fetching the indexed portion from the second storage system;

de-duplicating the indexed portion.

15. The computer system of claim 12, the changing being performed based on a number of requests for the log data received over a period of time or an amount of time for which indexed portions have been stored at the at least one first storage system.

16. The computer system of claim 11, the one or more first storage systems offering quicker data access than the one or more second storage systems.

17. The computer system of claim 11, the particular request identifying timing of the log data, a type of the log data, an application, a system, or a server.

18. The computer system of claim 11, the updating being performed based on an amount or a streaming rate of the log data.

19. The computer system of claim 11, the log data being immutable to the one or more search nodes.

20. The computer system of claim 11, the receiving comprising accepting, via the one or more search nodes, the one or more requests for log data from an aggregator node that exposes a remote procedure call application programming interface.

* * * * *